United States Patent
Bariant et al.

(10) Patent No.: US 10,921,445 B2
(45) Date of Patent: Feb. 16, 2021

(54) METHOD FOR OPERATING AN ULTRASONIC SENSOR APPARATUS FOR A MOTOR VEHICLE WITH ADAPTATION OF A TEMPORAL PROFILE OF AN AMPLITUDE IN FREQUENCY-MODULATED EXCITATION SIGNALS

(71) Applicant: VALEO Schalter und Sensoren GmbH, Bietigheim-Bissingen (DE)

(72) Inventors: Jean-Francois Bariant, Bietigheim-Bissingen (DE); Mathieu Baicry, Bietigheim-Bissingen (DE); Matthias Thomen, Ratingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 395 days.

(21) Appl. No.: 15/999,392

(22) Filed: Aug. 20, 2018

(65) Prior Publication Data

US 2019/0056495 A1  Feb. 21, 2019

(30) Foreign Application Priority Data

Aug. 18, 2017 (DE) .......................... 102017118883

(51) Int. Cl.
*G01S 15/32* (2006.01)
*G01S 15/93* (2020.01)
(Continued)

(52) U.S. Cl.
CPC .............. *G01S 15/32* (2013.01); *G01S 7/524* (2013.01); *G01S 7/54* (2013.01); *G01S 15/104* (2013.01); *G01S 15/931* (2013.01)

(58) Field of Classification Search
CPC ........ G01S 15/32; G01S 7/524; G01S 15/104; G01S 7/54; G01S 15/931; G01S 7/521; G01S 11/14
See application file for complete search history.

(56) References Cited

U.S. PATENT DOCUMENTS

2019/0056495 A1 * 2/2019 Bariant ................. G01S 15/104

FOREIGN PATENT DOCUMENTS

CN   109407081 A * 3/2019 ............... G01S 7/54
DE   4406525 A1   9/1995
(Continued)

OTHER PUBLICATIONS

Search Report issued in corresponding German Patent Application No. 10 2017 118 883.5, dated Apr. 6, 2018 (10 pages).

*Primary Examiner* — Daniel Pihulic

(74) *Attorney, Agent, or Firm* — Osha Bergman Watanabe & Burton LLP

(57) ABSTRACT

The invention relates to a method for operating an ultrasonic sensor apparatus (3) for a motor vehicle (1), in which a diaphragm of a first ultrasonic sensor (4a) is excited to emit a first ultrasonic signal using a frequency-modulated first excitation signal (10a) and a diaphragm of a second ultrasonic sensor (4b) is excited to emit a second ultrasonic signal using a frequency-modulated second excitation signal, wherein the diaphragm of the first ultrasonic sensor (4a) and the diaphragm of the second ultrasonic sensor (4b) have the same resonant frequency (fR), wherein the first excitation signal (10a) comprises a first frequency range (fa) and the second excitation signal comprises a second frequency range (fb) that differs from the first frequency range (fa), wherein a temporal profile of a maximum amplitude (Am) of the first excitation signal (10a) and a temporal profile of a maximum amplitude (Am) of the second excitation signal are changed.

12 Claims, 3 Drawing Sheets

(51) Int. Cl.
    *G01S 7/54*           (2006.01)
    *G01S 7/524*         (2006.01)
    *G01S 15/10*         (2006.01)
    *G01S 15/931*       (2020.01)

(56) References Cited

FOREIGN PATENT DOCUMENTS

| | | | | |
|---|---|---|---|---|
| DE | 101 06 142 A1 | | 8/2002 | |
| DE | 102011120447 A1 | | 6/2013 | |
| DE | 102013211846 A1 | | 12/2014 | |
| DE | 102017104145 A1 | * | 8/2018 | ........... G01S 15/931 |
| DE | 102017118883 A1 | * | 2/2019 | ........... G01S 15/104 |
| EP | 3444633 A1 | * | 2/2019 | ........... G01S 15/104 |
| JP | 2019035755 A | * | 3/2019 | ............. G01S 15/32 |
| KR | 20190019849 A | * | 2/2019 | ........... G01S 15/931 |

* cited by examiner

METHOD FOR OPERATING AN ULTRASONIC SENSOR APPARATUS FOR A MOTOR VEHICLE WITH ADAPTATION OF A TEMPORAL PROFILE OF AN AMPLITUDE IN FREQUENCY-MODULATED EXCITATION SIGNALS

The present invention relates to a method for operating an ultrasonic sensor apparatus for a motor vehicle, in which a diaphragm of a first ultrasonic sensor is excited to emit a first ultrasonic signal using a frequency-modulated first excitation signal and a diaphragm of a second ultrasonic sensor is excited to emit a second ultrasonic signal using a frequency-modulated second excitation signal, wherein the diaphragm of the first ultrasonic sensor and the diaphragm of the second ultrasonic sensor have the same resonant frequency. The present invention also relates to an ultrasonic sensor apparatus and to a driver assistance system. Finally, the present invention relates to a motor vehicle.

In the present case, interest is directed to ultrasonic sensor apparatuses for motor vehicles. Such ultrasonic sensor apparatuses can be used, for example, to capture an object in an area surrounding the motor vehicle. Such an ultrasonic sensor apparatus usually comprises a plurality of ultrasonic sensors which can each be used to determine a distance to the object. The ultrasonic sensors comprise a diaphragm which is excited to vibrate mechanically for the purpose of emitting the ultrasonic signal using a corresponding transducer element. The ultrasonic signal emitted by the ultrasonic sensor is then reflected by the object and strikes the diaphragm of the ultrasonic sensor again. This excites the diaphragm to vibrate mechanically, which mechanical vibrations can be captured using the transducer element and can be provided in the form of a sensor signal.

The prior art discloses ultrasonic sensor apparatuses and driver assistance systems in which up to six ultrasonic sensors are arranged on a bumper of the motor vehicle. It is also known that a measurement is carried out using the individual ultrasonic sensors in succession in order to avoid the ultrasonic sensors influencing one another. Since the ultrasonic sensors do not emit the respective ultrasonic signal at the same time, a comparatively long time is needed for a measuring cycle using the ultrasonic sensors. In order to reduce the duration of such a measuring cycle, the prior art discloses the practice of accordingly coding the ultrasonic signals emitted using the individual ultrasonic sensors. In this respect, DE 10 2011 120 447 A1 describes a method for operating an ultrasonic sensor in a motor vehicle. In this case, the ultrasonic sensor emits a transmission signal, wherein the phase of the transmission signal is modulated in such a manner that it has sudden phase changes. PSK modulation of the transmission signal is therefore carried out.

The prior art also discloses that an excitation signal which is used to excite the ultrasonic sensor or its transducer element is a frequency-modulated signal. In this connection, DE 10 2013 211 846 A1 describes a method for operating an environment capture system of a vehicle. In this case, a transmitting and receiving unit is used to emit a frequency-modulated signal and the transmitting and/or receiving unit and/or one or more further transmitting and/or receiving units receive(s) echo signals of the emitted frequency-modulated signal. The frequency-modulated signal may be a chirp signal.

The object of the present invention is to show a solution of how an area surrounding a motor vehicle can be captured in a safer and more reliable manner using an ultrasonic sensor apparatus for a motor vehicle having a plurality of ultrasonic sensors.

According to the invention, this object is achieved by means of a method, by means of an ultrasonic sensor apparatus, by means of a driver assistance system and by means of a motor vehicle having the features according to the respective independent claims. The dependent claims relate to advantageous developments of the present invention.

In one embodiment of a method for operating an ultrasonic sensor apparatus for a motor vehicle, a diaphragm of a first ultrasonic sensor is preferably excited to emit a first ultrasonic signal using a frequency-modulated first excitation signal. In addition, a diaphragm of a second ultrasonic sensor is excited to emit a second ultrasonic signal, in particular, using a frequency-modulated second excitation signal. In this case, provision is made, in particular, for the diaphragm of the first ultrasonic sensor and the diaphragm of the second ultrasonic sensor to have the same resonant frequency. In addition, provision is preferably made for the first excitation signal to comprise a first frequency range and for the second excitation signal to comprise a second frequency range that differs from the first frequency range. In addition, provision is made, in particular, for a temporal profile of a maximum amplitude of the first excitation signal and a temporal profile of a maximum amplitude of the second excitation signal to be changed.

A method according to the invention is used to operate an ultrasonic sensor apparatus for a motor vehicle. In this case, a diaphragm of a first ultrasonic sensor is excited to emit a first ultrasonic signal using a frequency-modulated first excitation signal and a diaphragm of a second ultrasonic sensor is excited to emit a second ultrasonic signal using a frequency-modulated second excitation signal, wherein the diaphragm of the first ultrasonic sensor and the diaphragm of the second ultrasonic sensor have the same resonant frequency. In this case, the first excitation signal comprises a first frequency range and the second excitation signal comprises a second frequency range which differs from the first frequency range. In addition, a temporal profile of a maximum amplitude of the first excitation signal and a temporal profile of a maximum amplitude of the second excitation signal are changed, in particular.

The method is intended to be used to operate an ultrasonic sensor apparatus for a motor vehicle. The ultrasonic sensor apparatus comprises the first ultrasonic sensor and the second ultrasonic sensor. In this case, provision is made, in particular, for the first ultrasonic sensor and the second ultrasonic sensor to be structurally identical. Provision may also be made for the ultrasonic sensor apparatus to comprise a plurality of ultrasonic sensors. The ultrasonic sensor apparatus can be used to capture objects or obstacles in an area surrounding the motor vehicle. For this purpose, an ultrasonic signal can be emitted using each of the ultrasonic sensors. In the present case, the first ultrasonic signal is emitted using the first ultrasonic sensor and the second ultrasonic signal is emitted using the second ultrasonic sensor. For this purpose, the diaphragm of the respective ultrasonic sensor is excited to vibrate mechanically using a corresponding transducer element, for example a piezoelectric element. For this purpose, an excitation signal in the form of a temporally variable electrical voltage can be applied to the respective transducer element. The respectively emitted ultrasonic signal is then reflected at the object in the area surrounding the motor vehicle and strikes the diaphragm of the ultrasonic sensor again. As a result, the diaphragm of the ultrasonic sensor is excited to vibrate mechanically. These mechanical vibrations of the diaphragm can be captured using the transducer element and can be output in the form of a sensor signal or raw signal which is provided, in particular, as a temporally variable electrical voltage.

According to an important aspect of the present invention, provision is made for the diaphragm of the first ultrasonic sensor to be excited using the first excitation signal in the first frequency range and for the diaphragm of the second ultrasonic sensor to be excited using the second excitation signal in the second frequency range. In this case, the respective excitation signals are provided as frequency-modulated signals. This means that the frequency of the respective excitation signals changes on the basis of the time. Provision is also made for the first frequency range of the first excitation signal to differ from the second frequency range of the second excitation signal. This means, in particular, that the first frequency range and the second frequency range do not overlap. As already explained, the ultrasonic sensors are structurally identical. This also means that the diaphragm of the first ultrasonic sensor and the diaphragm of the second ultrasonic sensor are structurally identical. The diaphragms have the same resonant frequency taking into account manufacturing tolerances. As a result of the fact that the diaphragm of the first ultrasonic sensor is excited in the first frequency range and the diaphragm of the second ultrasonic sensor is excited in the second frequency range, the first and second ultrasonic signals can be distinguished from one another during subsequent reception. It is therefore not necessary, in particular, to use different ultrasonic sensors, the diaphragms of which have different resonant frequencies. The signals from the first ultrasonic sensor and from the second ultrasonic sensor can thus be distinguished from one another in a simple and cost-effective manner. This is suitable, in particular, if the first ultrasonic sensor and the second ultrasonic sensor are intended to be arranged beside one another on a bumper of the motor vehicle and therefore there may be mutual influence.

The present invention is also based on the knowledge that overlaps can occur in the frequency range when emitting the first ultrasonic signal and the second ultrasonic signal. As already explained, the frequency ranges of the two frequency-modulated excitation signals differ. However, these excitation signals have gradually rising and falling edges, as a result of which the bandwidth of the emitted ultrasonic signals in the frequency range is widened beyond their actual frequency range. This may result in the ultrasonic signals being superimposed in the frequency range and therefore being influenced. In the present case, this is prevented by changing the temporal profile of the respective maximum amplitudes of the excitation signals. In this case, the maximum amplitude describes that amplitude which can be assumed at most by the respective excitation signal. The respective excitation signal is a temporally variable signal. The maximum amplitude can therefore describe an envelope or an envelope curve of the respective excitation signal. In this case, provision is made, in particular, for the maximum amplitudes of the excitation signals to be influenced during emission in such a manner that there is the smallest possible overlap between the first ultrasonic signal and the second ultrasonic signal in the frequency range. Furthermore, it is not necessary, in particular, for the first frequency range and the second frequency range to be adapted or shifted further from one another, thus reducing the transmission energy. Furthermore, it is not necessary for the respective frequency ranges to be made narrower, thus reducing the resolution which can be achieved. Therefore, efficient and reliable operation of the ultrasonic sensor apparatus can be enabled overall.

The first excitation signal and the second excitation signal are preferably provided as chirps. As already explained, the frequency changes on the basis of the time in the first excitation signal and the second excitation signal. In this case, provision may also be made for the first frequency range to be below the resonant frequency and for the second frequency range to be above the resonant frequency. The first excitation signal which is below the resonant frequency may be a positive chirp. In this case, the frequency of the signal may increase on the basis of the time. The second excitation signal which is above the resonant frequency may be a negative chirp in which the frequency decreases on the basis of the time. The excitation signals can be clearly distinguished from one another by accordingly adapting the temporal profile of the maximum amplitudes of the excitation signals.

According to one embodiment, the first excitation signal and the second excitation signal each extend from a rising section to a falling section which is assigned to the resonant frequency, wherein the maximum amplitude of the first excitation signal and the maximum amplitude of the second excitation signal are reduced in the falling section. In other words, the temporal profile of the maximum amplitude of the first excitation signal and of the second excitation signal can be adapted to the respective falling section. The maximum amplitudes may have a predetermined gradient or edge steepness in the falling section. The rising section of the excitation signal can be assigned to a starting frequency of the excitation signal and the falling section can be assigned to an end frequency of the excitation signal. This respective falling section of the excitation signals is assigned to the resonant frequency and therefore to a possible superimposition range of the excitation signals. The respective excitation signals can be prevented from having relatively flat edges in the region of the resonant frequency by adapting the temporal profile of the maximum amplitude in this falling section. In particular, provision may be made for the maximum amplitude to be adapted in the falling section in such a manner that the edge becomes steeper in comparison with the pure frequency-modulated excitation signal. It is therefore possible to prevent the excitation signals from overlapping in the frequency range.

In another embodiment, the maximum amplitude of the first excitation signal and the maximum amplitude of the second excitation signal are reduced in the rising section. The temporal profile of the maximum amplitude can also be adapted in the rising section. This rising section is present at the start of the emission of the respective excitation signals. This rising section describes the frequency range of the excitation signals which is furthest away from the resonant frequency. It is thus also possible here to prevent the respective ultrasonic signal from widening in the frequency range.

According to another embodiment, the temporal profile of the maximum amplitude of the first excitation signal and the temporal profile of the maximum amplitude of the second excitation signal describe a sigmoid function in the falling section and/or in the rising section. Such a sigmoid function has an S-shaped profile. This means that the temporal profile of the maximum amplitude in the rising section is initially increased along this S-function and is reduced along a reverse S-function at the end of the excitation signal. The maximum amplitude of the respective excitation signals may have a constant value or correspond to a linear function between the rising section and the falling section. In principle, such a profile can be enabled with the aid of a corresponding window function. For example, this window function may be designed such that it is formed by a combination of two sigmoid functions which overlaps at half the transmission duration of the respective excitation signal. In principle, other functions or window functions can also be used. Examples are Hanning windows, Blackman windows, Tukey windows or the like. This makes it possible, in particular, to easily and reliably adapt the temporal profile of the maximum amplitudes.

It is also advantageous if the diaphragm of the first ultrasonic sensor and the diaphragm of the second ultrasonic sensor are excited at the same time. This means that the first ultrasonic signal and the second ultrasonic signal are emitted at the same time. The first ultrasonic signal which is emitted using the first ultrasonic sensor can be reflected by an object in the area surrounding the motor vehicle. The first ultrasonic signal can then be received again using the first ultrasonic sensor. It is also possible to carry out a so-called cross-measurement in which the first ultrasonic signal is received using the second ultrasonic sensor. In the same manner, the second ultrasonic signal which is emitted using the second ultrasonic sensor can be received both using the second ultrasonic sensor and using the first ultrasonic sensor. Since the first ultrasonic signal and the second ultrasonic signal can be distinguished from one another on the basis of their different frequency ranges during reception, the first ultrasonic signal and the second ultrasonic signal can be emitted at the same time. A measuring cycle which is carried out using the ultrasonic sensor apparatus can therefore be carried out within a shorter time, for example. This makes it possible to reliably monitor the area surrounding the motor vehicle.

In another configuration, the first ultrasonic signal and/or second ultrasonic signal reflected by an object in an area surrounding the motor vehicle is/are correlated with the first excitation signal and/or the second excitation signal. As already explained, both the first reflected ultrasonic signal and the second reflected ultrasonic signal can be received using the first ultrasonic sensor. In order to check whether the received ultrasonic signal describes the first ultrasonic signal or the second ultrasonic signal, the received ultrasonic signal can be correlated with the first excitation signal and/or the second excitation signal. The correspondence of the received ultrasonic signal to one of the excitation signals is therefore checked. This can be carried out in the same manner for the second ultrasonic sensor. It is therefore not necessary for the received ultrasonic signal to be accordingly filtered, for example.

In another embodiment, at least one diaphragm of a third ultrasonic sensor is additionally excited to emit a third ultrasonic signal using a frequency-modulated third excitation signal. In other words, the method can be fundamentally extended to a plurality of ultrasonic sensors or channels. In this case, a defined frequency range can be assigned to each ultrasonic sensor.

An ultrasonic sensor apparatus according to the invention for a motor vehicle comprises a first ultrasonic sensor and a second ultrasonic sensor. In this case, the ultrasonic sensor apparatus is preferably designed to carry out a method according to the invention and the advantageous configurations of the latter. As already explained, the ultrasonic sensor apparatus may also comprise a plurality of ultrasonic sensors. In addition, the ultrasonic sensor apparatus can comprise an electronic control device which is connected to the ultrasonic sensors for the purpose of transmitting data. The respective excitation signal can be transmitted to the ultrasonic sensors or their transducer elements using this control device.

In addition, the sensor signal or the raw signal can be transmitted to the control device using the respective ultrasonic sensors upon reception.

A driver assistance system according to the invention for a motor vehicle comprises an ultrasonic sensor apparatus according to the invention. In principle, objects can be detected in the area surrounding the motor vehicle with the aid of the driver assistance system. If it is detected that there is a threat of a collision between the motor vehicle and the object, a corresponding warning can be output to the driver. Provision may also be made for the driver assistance system to manoeuvre the motor vehicle at least in a semi-autonomous manner on the basis of the relative position between the motor vehicle and the object. The driver assistance system can be in the form of a park assist system, for example.

A motor vehicle according to the invention comprises a driver assistance system according to the invention. The motor vehicle is in the form of a passenger car, in particular. Provision may also be made for the motor vehicle to be in the form of a commercial vehicle.

The preferred embodiments and their advantages presented with respect to the method according to the invention accordingly apply to the ultrasonic sensor apparatus according to the invention, to the driver assistance system according to the invention and to the motor vehicle according to the invention.

Further features of the invention emerge from the claims, the figures and the description of the figures. The features and combinations of features mentioned above in the description and the features and combinations of features mentioned below in the description of the figures and/or shown in the figures alone can be used not only in the respectively stated combination, but also in other combinations, without departing from the scope of the invention. Embodiments which are not explicitly shown and explained in the figures but emerge and can be produced by means of separate combinations of features from the embodiments explained should therefore also be considered to have been covered and disclosed by the invention. Embodiments and combinations of features which therefore do not have all features of an originally formulated independent claim can also be considered to have been disclosed. Embodiments and combinations of features which, in particular as a result of the embodiments explained above, go beyond or differ from the combinations of features presented in the dependency references of the claims should also be considered to have been disclosed.

The invention is now explained in more detail on the basis of preferred exemplary embodiments and with reference to the accompanying drawings, in which.

In the figures, identical or functionally identical elements are provided with the same reference symbols.

Figure 1:
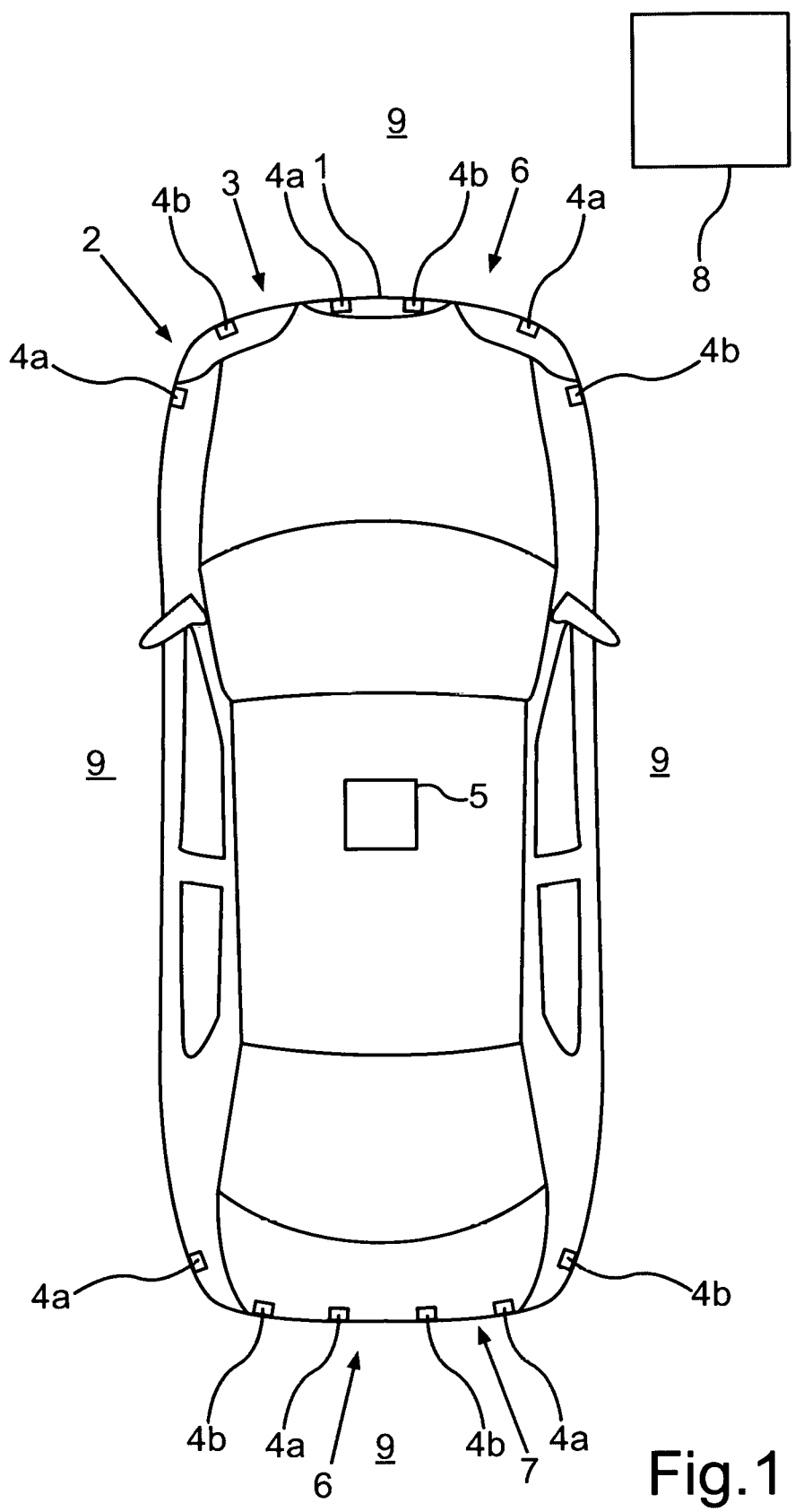
FIG. 1 shows a motor vehicle according to one embodiment of the invention having a driver assistance system with an ultrasonic sensor apparatus.

FIG. 1 shows a plan view of a motor vehicle 1 according to one embodiment of the invention. In the present case, the motor vehicle 1 is in the form of a passenger car. The motor vehicle 1 comprises a driver assistance system 2 which is used to assist a driver with the driving of the motor vehicle 1. In particular, the driver assistance system 2 can be in the form of a park assist system which can be used to assist the driver when parking the motor vehicle 1 in a parking space and/or when moving the vehicle out of the parking space.

The driver assistance system 2 in turn comprises an ultrasonic sensor apparatus 3. The ultrasonic sensor apparatus 3 has at least one first ultrasonic sensor 4a and one second ultrasonic sensor 4b. In the present exemplary embodiment, the ultrasonic sensor apparatus 3 comprises a total of twelve ultrasonic sensors 4a, 4b. In this case, six ultrasonic sensors 4a, 4b are arranged in a front area 6 of the motor vehicle 1 and six ultrasonic sensors 4a, 4b are arranged in a rear area 7 of the motor vehicle 1. In the present case, the first ultrasonic sensors 4a and the second ultrasonic sensors 4b are arranged in an alternating manner. The ultrasonic sensors 4a, 4b can be mounted, in particular, on the bumpers of the motor vehicle 1. In this case, the ultrasonic sensors 4a, 4b may be arranged, at least in certain areas, in corresponding recesses or passage openings of the bumpers. Provision may also be made for the ultrasonic sensors 4a, 4b to be arranged in a manner concealed behind the bumpers. In principle, the ultrasonic sensors 4a, 4b can also be arranged on further trim parts of the motor vehicle 1. For example, the ultrasonic sensors 4a, 4b can be arranged on or concealed behind the doors of the motor vehicle 1.

The respective ultrasonic sensors 4a, 4b can be used to provide sensor signals describing at least one object 8 in an area 9 surrounding the motor vehicle 1. In the present case, an object 8 is schematically shown in the surrounding area 9. In order to determine the sensor signal, an ultrasonic signal can be emitted using each of the ultrasonic sensors 4a, 4b. The ultrasonic signal reflected by the object 8 can then be received again. A distance between the ultrasonic sensor 4a, 4b and the object 8 can then be determined on the basis of the propagation time of the ultrasonic signal. Provision may also be made for the respective distances which are determined using different ultrasonic sensors 4a, 4b to be taken into account. The relative position between the motor vehicle 1 and the object can therefore be determined by means of trilateration.

The ultrasonic sensor apparatus 3 also comprises an electronic control device 5 which is connected to the ultrasonic sensors 4a, 4b for the purpose of transmitting data. In the present case, a corresponding data line is not illustrated for the sake of clarity. The sensor signals from the ultrasonic sensors 4a, 4b can be received and evaluated in this manner by the control device 5. This information can then be used by the driver assistance system 2 to provide the driver of the motor vehicle 1 with an output. In addition, provision may be made for the driver assistance system 2 to intervene in a steering system, a brake system and/or a drive motor in order to manoeuvre the motor vehicle 1 at least in a semi-autonomous manner on the basis of the captured object 8.

Figure 2:
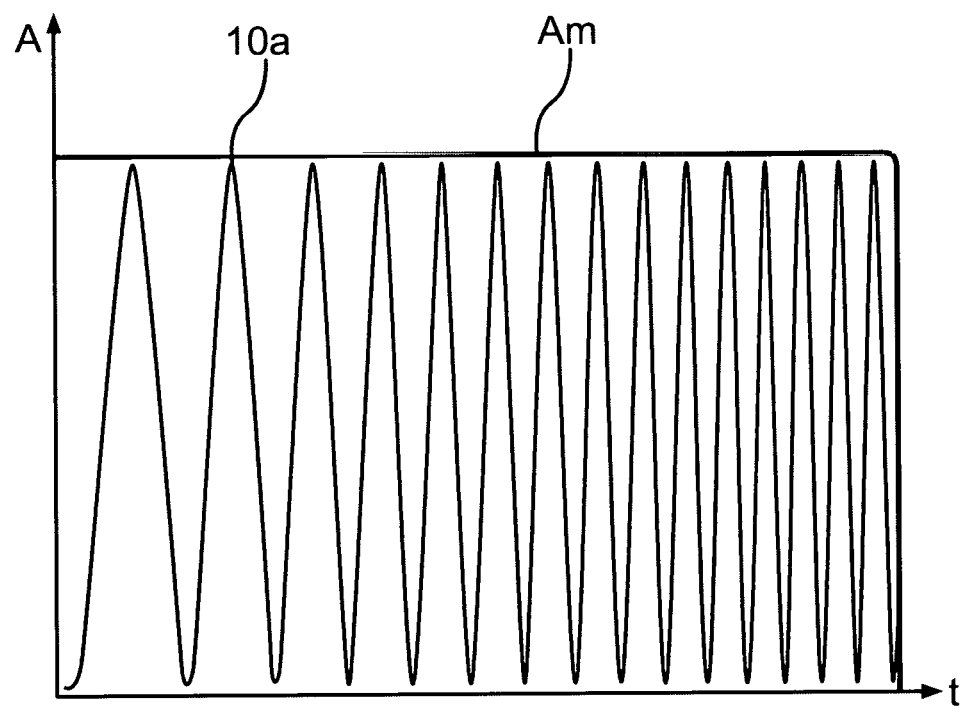
FIG. 2 shows a temporal profile of an excitation signal which is used to excite an ultrasonic sensor to emit an ultrasonic signal according to the prior art.

The control device 5 is also used to provide excitation signals 10a which are used to excite the respective ultrasonic sensors 4a, 4b. FIG. 2 illustrates, by way of example, a first excitation signal 10a for the first ultrasonic sensors 4a. In this case, the time t is plotted on the abscissa and the amplitude A is plotted on the ordinate. The excitation signal 10a is provided, in particular, in the form of an electrical voltage and is applied to a transducer element of the first ultrasonic sensor 4a. It can be seen in FIG. 2 that the first excitation signal is a frequency-modulated signal and, in particular, a chirp. This means that the frequency f of the excitation signal 10a changes on the basis of the time t. In the present case, the frequency f of the first excitation signal 10a linearly increases on the basis of the time t. The first excitation signal 10a comprises a first frequency range fa which is below a resonant frequency fR of the diaphragms of the ultrasonic sensors 4a, 4b. The second ultrasonic sensors 4b are excited using a second excitation signal. The second excitation signal 10b comprises a second frequency range fb which is above the resonant frequency fR. The resonant frequency of the diaphragms may be in the region of 50 kHz. In the second excitation signal, the frequency f may likewise be linearly increased. It may therefore have a similar profile to the first excitation signal 10a but with higher frequencies. Provision may also be made for the frequency f to linearly decrease on the basis of the time t in the second excitation signal.

As can be seen in FIG. 2, a maximum amplitude Am of the first excitation signal 10a has a constant value. The first excitation signal 10a also has a sinusoidal profile, wherein the frequency f is linearly increased on the basis of the time t. The temporal profile of the first excitation signal 10a and of the second excitation signal can be determined according to the following formula:

$$Y(t)=\sin(f(t)\cdot 2\pi\cdot t)\cdot Am.$$

Figure 3:
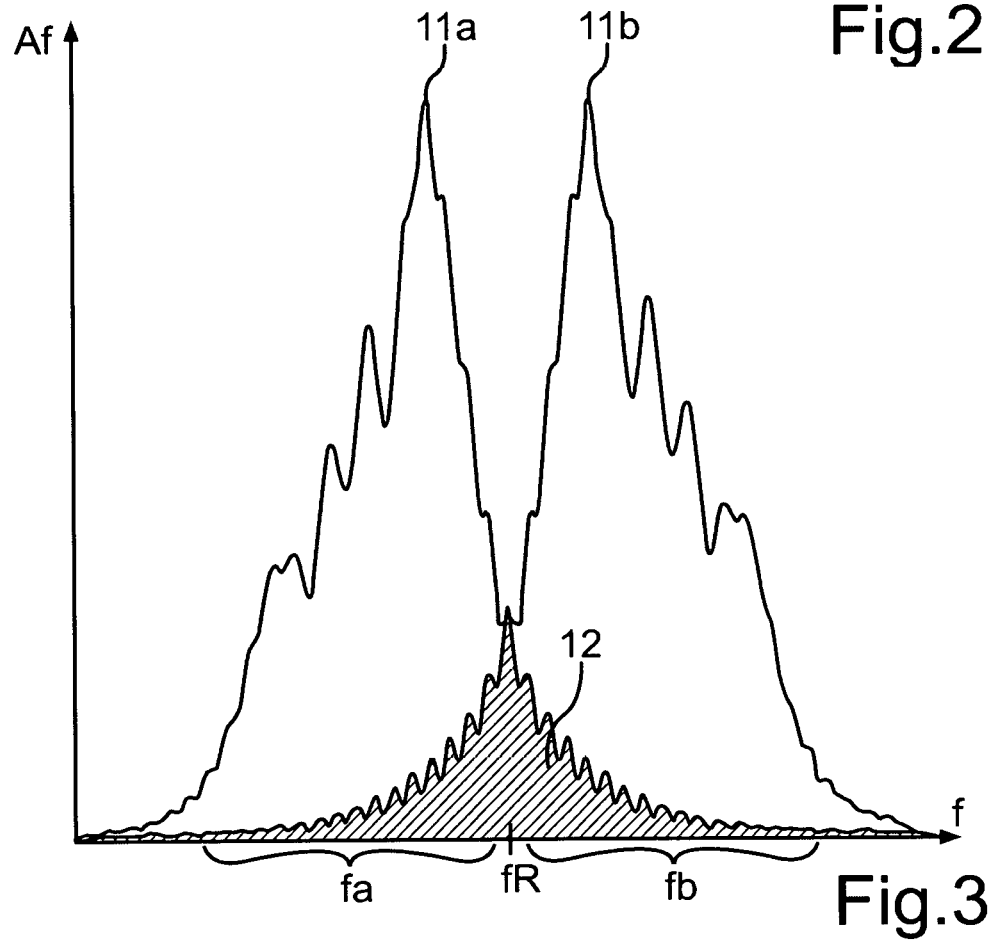
FIG. 3 shows frequency spectra of a first ultrasonic signal and of a second ultrasonic signal according to the prior art.

The first ultrasonic sensors 4a are used to emit a first ultrasonic signal. For this purpose, the first ultrasonic sensors 4a are excited using the first excitation signal 10a. The second ultrasonic sensors 4b are used to emit a second ultrasonic signal. For this purpose, the second ultrasonic sensors 4b are excited using the second excitation signal 10b. In this respect, FIG. 3 shows a first amplitude spectrum 11a of the first emitted ultrasonic signal and a second amplitude spectrum 11b of the second emitted ultrasonic signal. In this case, the frequency f is plotted on the abscissa and an amplitude Af is plotted on the ordinate. On account of the edges of the excitation signals 10a, the amplitude spectra 11a, 11b overlap for the ultrasonic signals in the spectral range. In the present case, an area 12 which describes the overlap of the amplitude spectra 11a, 11b is marked. On account of this overlap, the ultrasonic signals reflected by the object 8 may be influenced.

Figure 4:
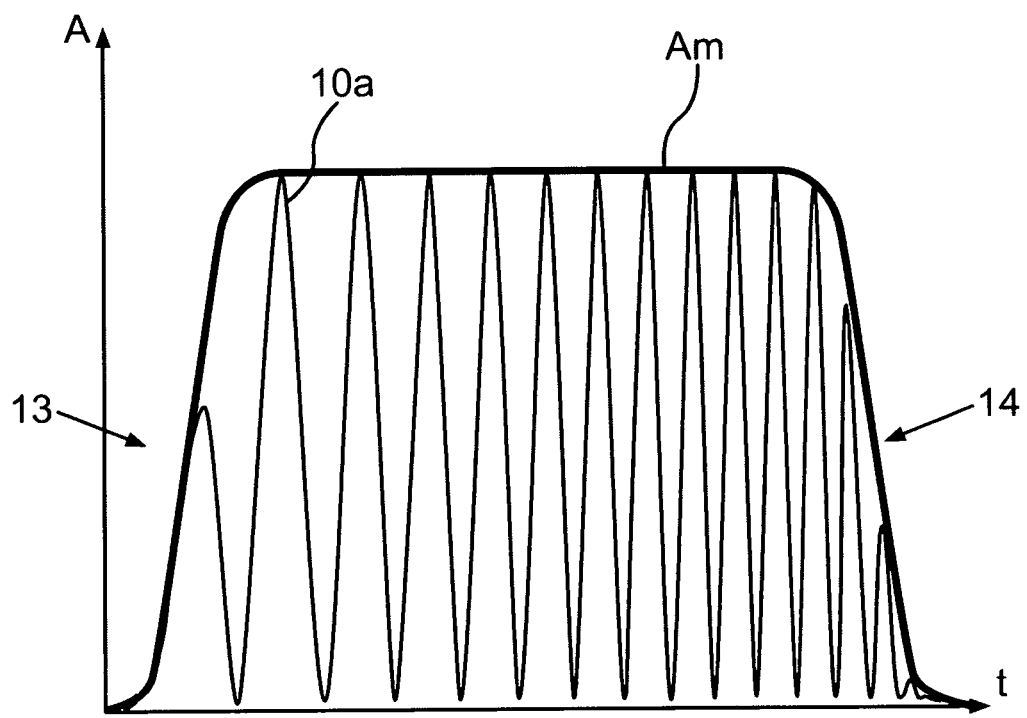
FIG. 4 shows a temporal profile of an excitation signal for an ultrasonic sensor according to one embodiment of the invention.

In comparison with this, FIG. 4 shows a temporal profile of a first excitation signal 10a according to one embodiment of the invention. It can be seen in this case that the maximum amplitude Am of the first excitation signal 10a is adapted on the basis of the time t. The first excitation signal 10a has a rising section 13 which is assigned to a start of the emission. The first excitation signal 10a also has a falling section 14 which is assigned to the end of the emission. The falling section 14 is likewise assigned to the resonant frequency fR of the diaphragm. The temporal profile of the maximum amplitude Am is therefore adapted in the excitation signal 10a. The temporal profile of the first excitation signal 10a can be described using the following formula:

$$Y(t)=\sin(f(t)\cdot 2\pi\cdot t)\cdot Am(t).$$

In the present example, the maximum amplitude Am of the first excitation signal 10a has the profile of a sigmoid function in the rising section 13 and in the falling section 14.

Figure 5:
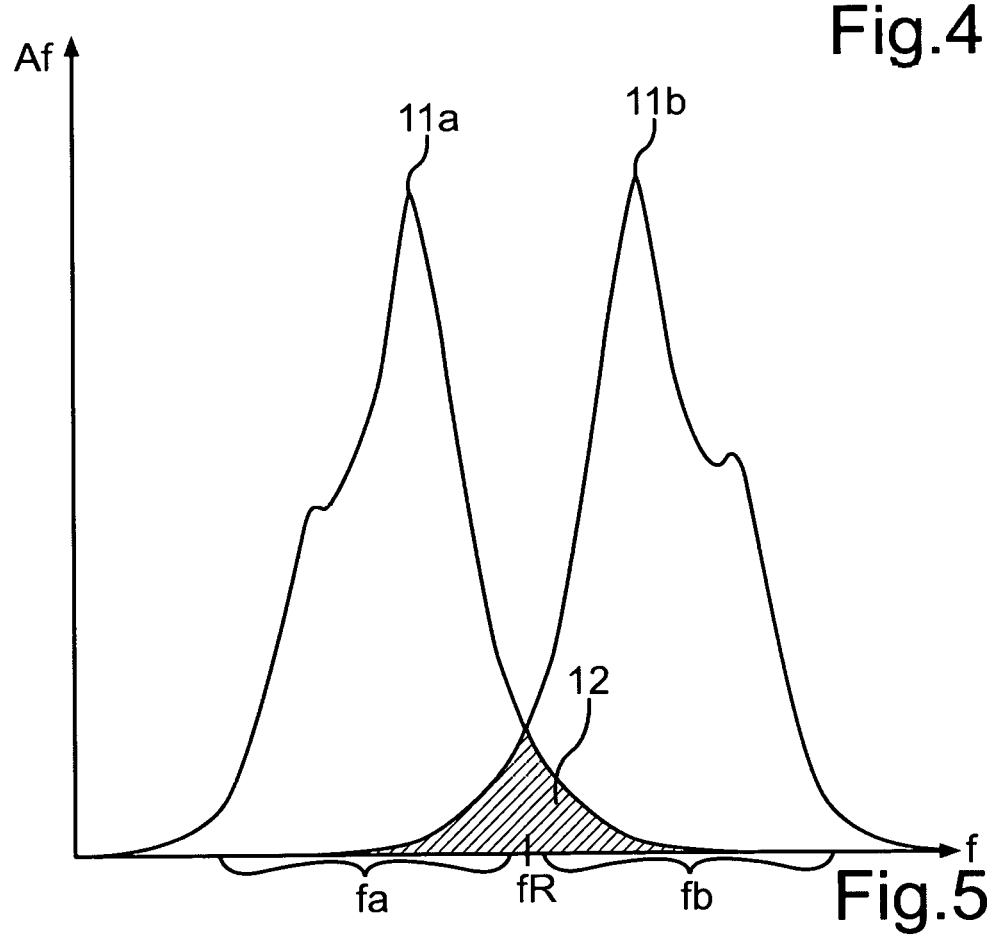
FIG. 5 shows frequency spectra of a first ultrasonic signal and of a second ultrasonic signal according to one embodiment of the invention.

The temporal profile of the maximum amplitude Am of the second excitation signal may have the same profile. As a result, the excitation signals have a defined gradient or edge at the rising sections 13 and, in particular, at the falling sections 14. This makes it possible to considerably reduce the widening of the emitted and received ultrasonic signals. In the frequency range. In particular, the area 12 describing the overlap of the amplitude spectra 11a, 11 b in the region of the resonant frequency can be considerably reduced. This can be seen in FIG. 5 which shows the amplitude spectra 11a, 11 b of the ultrasonic signals. In this case, the ultrasonic sensors 4a, 4b were excited using the excitation signals 10a in which the temporal profile of the maximum amplitudes Am was adapted.

The invention claimed is:

1. A method for operating an ultrasonic sensor apparatus for a motor vehicle, the method comprising:
    exciting a diaphragm of a first ultrasonic sensor to emit a first ultrasonic signal using a frequency-modulated first excitation signal; and
    exciting a diaphragm of a second ultrasonic sensor to emit a second ultrasonic signal using a frequency-modulated second excitation signal,
    wherein the diaphragm of the first ultrasonic sensor and the diaphragm of the second ultrasonic sensor have the same resonant frequency,
    wherein the first excitation signal comprises a first frequency range and the second excitation signal comprises a second frequency range that differs from the first frequency range, and
    wherein a temporal profile of a maximum amplitude of the first excitation signal and a temporal profile of a maximum amplitude of the second excitation signal are changed.

2. The method according to claim 1, wherein the first excitation signal and the second excitation signal are provided as chirps.

3. The method according to claim 1, wherein the first frequency range is below the resonant frequency and the second frequency range is above the resonant frequency.

4. The method according to claim 1, wherein the first excitation signal and the second excitation signal each extend from a rising section to a falling section which is assigned to the resonant frequency, wherein the maximum amplitude of the first excitation signal and the maximum amplitude of the second excitation signal are reduced in the falling section.

5. The method according to claim 4, wherein the maximum amplitude of the first excitation signal and the maximum amplitude of the second excitation signal are reduced in the rising section.

6. The method according to claim 4, wherein or the temporal profile of the maximum amplitude of the first excitation signal and of the maximum amplitude of the second excitation signal describes a sigmoid function in the falling section and/or in the rising section.

7. The method according to claim 1, wherein the diaphragm of the first ultrasonic sensor and the diaphragm of the second ultrasonic sensor are excited at the same time.

8. The method according to claim 1, wherein the first ultrasonic signal and/or second ultrasonic signal reflected by an object in an area surrounding the motor vehicle is/are correlated with the first excitation signal and/or the second excitation signal.

9. The method according to claim 1, wherein at least one diaphragm of a third ultrasonic sensor is additionally excited to emit a third ultrasonic signal using a frequency-modulated third excitation signal.

10. An ultrasonic sensor apparatus for a motor vehicle, comprising:
    a first ultrasonic sensor;
    a second ultrasonic sensor; and
    a control device, wherein the ultrasonic sensor apparatus is configured to perform a method according to claim 1.

11. A driver assistance system for a motor vehicle, having an ultrasonic sensor apparatus according to claim 10.

12. A motor vehicle having a driver assistance system according to claim 11.

* * * * *